United States Patent [19]

Magnusson et al.

[11] Patent Number: 4,868,848
[45] Date of Patent: Sep. 19, 1989

[54] COMPUTER OPERATED SYSTEM FOR DIALING TELEPHONE NUMBERS

[75] Inventors: Joseph W. Magnusson; Dennis W. Dufford, both of Noblesville, Ind.

[73] Assignee: GTE North Incorporated, Westfield, Ind.

[21] Appl. No.: 135,800

[22] Filed: Dec. 21, 1987

[51] Int. Cl.⁴ .............................................. H04M 1/27
[52] U.S. Cl. ..................................... 379/355; 379/216
[58] Field of Search ............... 379/355, 354, 356, 361, 379/216

[56] References Cited

U.S. PATENT DOCUMENTS 4,731,826  3/1988  Daie .................. 379/355 X

FOREIGN PATENT DOCUMENTS 0206391 12/1986 European Pat. Off. ............ 379/355
2583600 12/1986 France ................................. 379/355

OTHER PUBLICATIONS

Peter H. Lewis, The New York Times, "Phone Book for the PC", 4/12/88, Section C, p. 2.

Primary Examiner—James L. Dwyer
Attorney, Agent, or Firm—J. Stephen Yeo

[57] ABSTRACT

A computer operated telephone dialing system has a program that selects a telephone number from a directory of names and corresponding telephone numbers. The program sends an off-hook instruction and a select flag to the computer's printer port, followed by a hexidecimal code sequence representing digits of the telephone number. A dialing circuit coupled to said printer port is activated by the select flag and, in response to the hexidecimal code sequence, provides DTMF dialing signals to telephone lines. The program then sends an on-hook signal, allowing a telephone handset to be used.

3 Claims, 2 Drawing Sheets

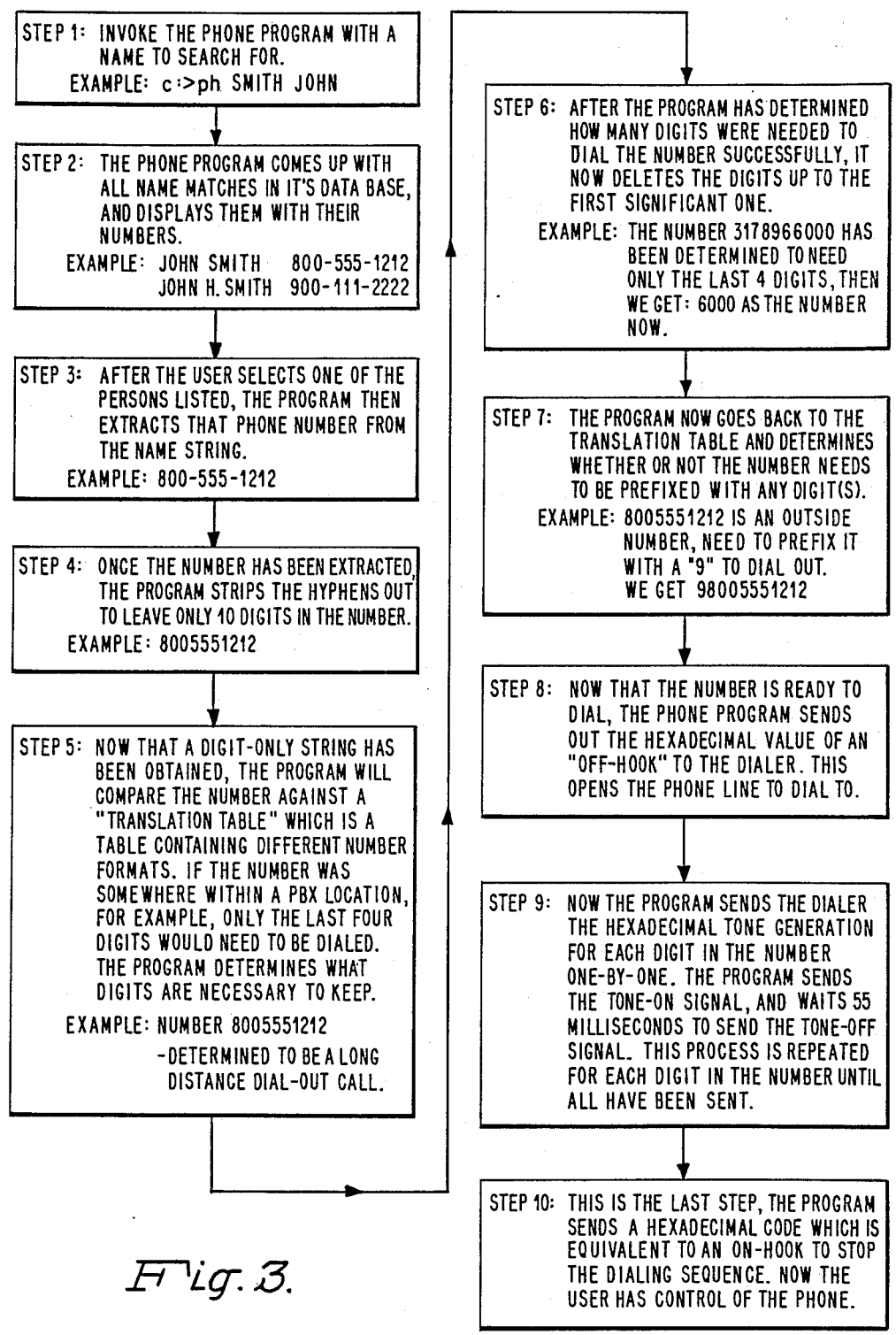

COMPUTER OPERATED SYSTEM FOR DIALING TELEPHONE NUMBERS

This invention pertains to automatic telephone dialing, and more particularly is concerned with automatic dialing from a personal computer.

It is known for a personal computer to have the capability to automatically access a telephone line and to dial a stored number. Often the dialing is part of a data transfer sequence. In other cases, the dialing is in response to a number selected from a stored list or directory. Modems have been used for both applications. In some situations a modem is not otherwise required. This is true where a digital transmission network is available (e.g. a LAN) or where only the call up feature is necessary. It is desirable to provide means to automatically dial selected phone numbers without the need of a modem.

SUMMARY OF THE INVENTION

Briefly, according to one aspect of the invention, a computer operated telephone dialing system is provided. A computer has a program that fetches a telephone number from a directory. The program sends an off-hook instruction and a select flag to the computer's printer port, followed by a hexidecimal code sequence representing the digits of the number. A dialing circuit coupled to the printer port is activated by the select flag and, in response to the hexidecimal code sequence, provides DTMF dialing signals to telephone lines. At the end of the sequence the program sends an on-hook signal.

BRIEF DESCRIPTION OF THE DRAWING

FIG. 3 is a flowchart of a program which is part of the computer system.

DETAILED DESCRIPTION OF THE INVENTION

Figure 1:
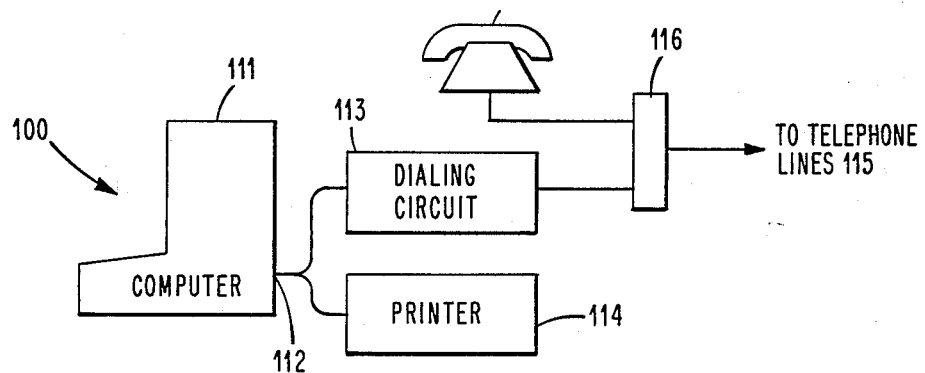
FIG. 1 is a block diagram of a computer system embodying the invention.

Turning first to FIG. 1 there is seen a block diagram of a computer system 100 embodying the invention. A computer 111, such as an IBM PC (TM) personal computer, has a printer port 112, which is designed to be an interface between the computer and a printer. As a feature of the invention a dialing circuit 113 is connected to printer port 112. Printer 114 may be connected in parallel to the dialing circuit 113.

The dialing circuit 113 has an output coupled to the tip-and-ring wires of a local telephone line 115. A tee connector 116 may be used so a telephone 117 can use the same line.

Printer port 112, typically, has twenty five consecutively numbered contacts. Contacts 2 through 9 are the interface of an 8-bit data bus. Contact 17 is for the "select" flag. Contact 25 is ground, contact 13 is autofeed, and contact 15 is error.

Figure 2:
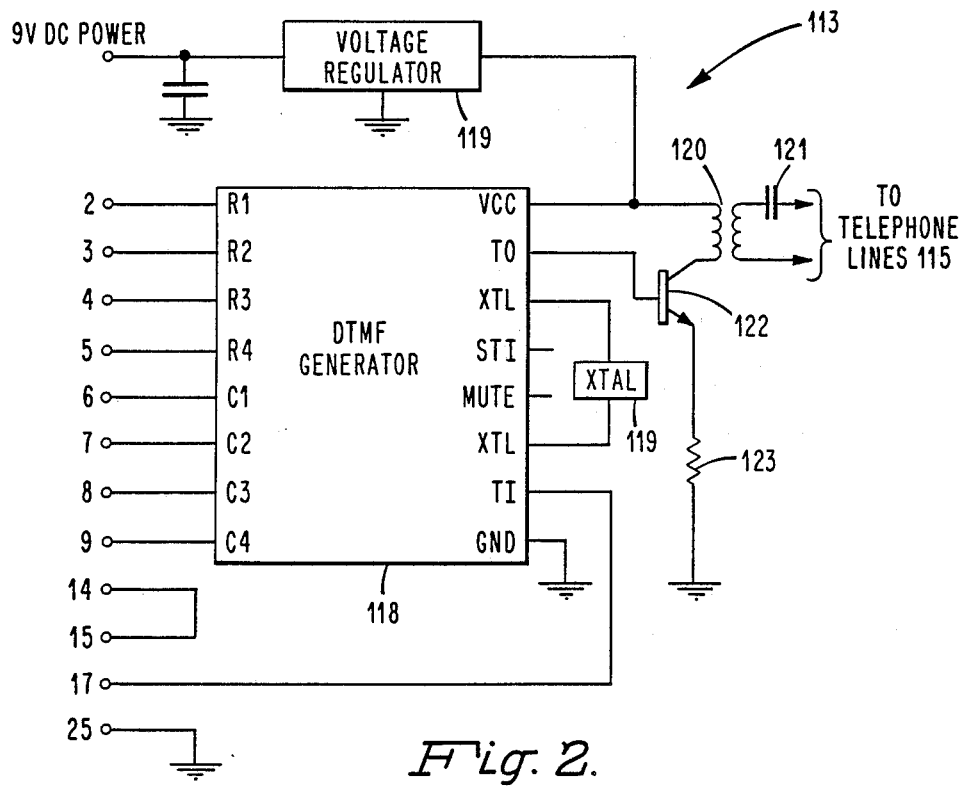
FIG. 2 is a schematic drawing of a dialing circuit which is part of the computer system.

Referring to FIG. 2, the dialing circuit 113 contains a dual tone multi-frequency (DTMF) generator 118, such as a TP5089 integrated circuit available from National Semiconductor Corporation. The input to DTMF generator 118 is coupled to the computer's 8-bit data bus, via contacts 2 through 9. Voltage regulator 119, coupled to contacts 11 and 25 provides five volts to DTMF generator 118. A 3.58 MHz crystal 119 provides a reference frequency to DTMF generator 118. The output of DTMF generator 118 is coupled to the tip-and-ring wires 115 through coupling transformer 120 and DC blocking capacitor 121. A transistor 122 and resistor 123 on the primary side of transformer 120 limits the level of the DTMF dialing signals. Autofeed contact 13 is connected by dialing circuit 113 to error contact 15.

The computer has, as part of its data base, a phone directory, wherein there is a listing of strings, each string having a name and a corresponding 10-digit hyphenated telephone number, e.g. Sandra E. Curelop XXX—XXX—XXXX.

In addition to the directory data base, the computer has a dialing program following the flowchart of FIG. 3.

In operation, the user selects a name from the data base. The program extracts the number from the corresponding string and modifies it. First the hyphens are deleted. The data base contains a translator table to which the program compares the number. If the call is found to be long distance, all ten digits are retained. If the call is found to be local, the three digit area code is stripped and the last seven digits of the number are retained. In both cases, additional access numbers may be prefixed, e.g. 9XXXXXXX and 91XXXXXXXXXX. If, however, the call is internal, e.g. placed and received within a common private automatic branch exchange (PABX), only the last four digits are retained.

The dialing program converts each digit of the modified number into hexidecimal notation.

The dialing program now sends, via the printer port, a select flag which activates the dialer circuit 113 and deactivates the parallel printer 114, and a hexidecimal code of an "off-hook" instruction for dialer circuit 113 to open the telephone line 115. For each digit of the number to be called the dialing program sends a tone-on instruction, followed by the hexidecimal code of the digit, followed in fifty-five milliseconds by a tone-off instruction. During the fifty-five millisecond interval, between the tone-on and tone-off instructions, the dialer circuit 113 generates DTMF dialing signals corresponding to the digit of the number being sent. These steps are repeated until all digits of the modified number are converted to a hexidecimal sequence and sent as DTMF signals to the telephone line 115. The dialing program then sends a hexidecimal coded instruction for "on-hook", freeing the telephone for use.

The best mode and preferred embodiment of the invention has been described above. Various modifications and equivalents to the program and dialing circuit will now be apparent to those skilled in the art. Accordingly the scope of the invention is defined by the claims.

We claim:

1. A telephone dialing system comprising:
   a. a computer having a printer port;
   b. a data base, accessible by said computer containing a directory of names and corresponding telephone numbers;
   c. program means for selecting a name and corresponding number from said directory; for sending an off-hook instruction and a select flag to said printer port, for sending to said printer port a hexidecimal code sequence representing digits of the corresponding number and for sending an on-hook instruction to said printer port; and d. a dialing circuit coupled to said printer port and adapted to be coupled to telephone lines, said dialing circuit activated by said select flag and providing DTMF dialing signals corresponding to said hexidecimal code sequence.

2. The telephone dialing computer system of claim 1 which further includes software means for determining if a corresponding number is long distance, local, or internal, and wherein said program means modifies the number of digits of a corresponding number in accordance with said determination.

3. The telephone computer system of claim 1 wherein said dialing circuit includes a DTMF generator for generating DTMF dialing signals in response to said hexidecimal sequence, a transformer arranged to couple said DTMF dialing signals to a telephone line, and means for limiting the level of said DTMF dialing signals.

* * * * *